US011361021B2

(12) United States Patent
Detroja et al.

(10) Patent No.: US 11,361,021 B2
(45) Date of Patent: Jun. 14, 2022

(54) SYSTEMS AND METHODS FOR MUSIC RELATED INTERACTIONS AND INTERFACES

(71) Applicant: Meta Platforms, Inc., Menlo Park, CA (US)

(72) Inventors: Parth Popatlal Detroja, Redwood City, CA (US); Brian Huntley, San Jose, CA (US); Eddie Leo Padron de la Torre, San Francisco, CA (US)

(73) Assignee: Meta Platform, Inc., Menlo Park, CA (US)

( * ) Notice: Subject to any disclaimer, the term of this patent is extended or adjusted under 35 U.S.C. 154(b) by 0 days.

(21) Appl. No.: 16/529,542

(22) Filed: Aug. 1, 2019

(65) Prior Publication Data

US 2021/0034666 A1 Feb. 4, 2021

(51) Int. Cl.
*G06F 16/68* (2019.01)
*G06F 16/683* (2019.01)
*G06F 16/783* (2019.01)

(52) U.S. Cl.
CPC .......... *G06F 16/686* (2019.01); *G06F 16/685* (2019.01); *G06F 16/7834* (2019.01)

(58) Field of Classification Search
CPC ... G06F 16/686; G06F 16/7834; G06F 16/685
See application file for complete search history.

(56) References Cited

U.S. PATENT DOCUMENTS

| 8,683,068 | B2 * | 3/2014 | Jalili | G06F 16/4393 |
| | | | | 709/231 |
| 10,345,998 | B2 * | 7/2019 | Sessak | G06F 3/165 |
| 2002/0152278 | A1 | 10/2002 | Pontenzone et al. | |
| 2003/0236695 | A1 | 12/2003 | Litwin, Jr. | |
| 2008/0091717 | A1 | 4/2008 | Garbow et al. | |
| 2008/0163119 | A1 * | 7/2008 | Kim | G11B 19/025 |
| | | | | 715/840 |
| 2009/0100093 | A1 | 4/2009 | Makipaa | |
| 2010/0070917 | A1 | 3/2010 | Gates et al. | |
| 2010/0275120 | A1 * | 10/2010 | Pappas | G06F 3/0481 |
| | | | | 715/716 |
| 2010/0318544 | A1 | 12/2010 | Nicolov | |
| 2013/0097014 | A1 | 4/2013 | Martin et al. | |
| 2013/0275506 | A1 | 10/2013 | Warner | |
| 2013/0282486 | A1 | 10/2013 | Rahle et al. | |
| 2014/0020116 | A1 * | 1/2014 | Chastagnol | G06F 16/7867 |
| | | | | 726/28 |
| 2014/0095291 | A1 | 4/2014 | Dey et al. | |

(Continued)

OTHER PUBLICATIONS

Bharathi, Issac, "Configuring & Managing Alerts and Notifications Using Director", Feb. 16, 2016, p. 16 (Year: 2016) (Year: 2016) (Year: 2016) (Year: 2016) (Year: 2016).*

*Primary Examiner* — Jennifer N Welch
*Assistant Examiner* — Amy P Hoang
(74) *Attorney, Agent, or Firm* — Sheppard Mullin Richter & Hampton LLP

(57) ABSTRACT

Systems, methods, and non-transitory computer-readable media can be configured to identify audio content included in a video content item. A notification can be provided based at least in part on the identification. An interface that presents information associated with the identified audio content can be provided based at least in part on a user interaction with the notification.

20 Claims, 9 Drawing Sheets

(56) References Cited

U.S. PATENT DOCUMENTS

| | | |
|---|---|---|
| 2014/0324885 A1 | 10/2014 | McKenzie |
| 2015/0301718 A1* | 10/2015 | Trollope ............... G06F 16/632 |
| | | 715/716 |
| 2017/0193100 A1 | 7/2017 | Bowery |
| 2018/0189391 A1 | 7/2018 | Ip et al. |
| 2020/0034385 A1* | 1/2020 | Blum .................... G06F 16/635 |

* cited by examiner

SYSTEMS AND METHODS FOR MUSIC RELATED INTERACTIONS AND INTERFACES

FIELD OF THE INVENTION

The present technology relates to the field of digital content platforms. More particularly, the present technology relates to user interfaces and user interactions related to audio content.

BACKGROUND

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Another user may access the social networking system and interact with the shared content item. In some cases, the shared content item can include audio content.

SUMMARY

Various embodiments of the present technology can include systems, methods, and non-transitory computer readable media configured to identify audio content included in a video content item. A notification can be provided based at least in part on the identification. An interface that presents information associated with the identified audio content can be provided based at least in part on a user interaction with the notification.

In an embodiment, the interface can further present a call-to-action associated with an interaction with the identified audio content.

In an embodiment, the interaction with the audio content can involve a generation of a new video content item based at least in part on the identified audio content.

In an embodiment, the generation of the new video content item can be further based at least in part on at least one of: an album art image, a stock image, a user submitted image, or a user submitted video.

In an embodiment, the interface can further present at least one recommendation for another video content item based at least in part on the identified audio content.

In an embodiment, the video content item can continue to play while the interface is provided.

In an embodiment, the notification can be provided at a start of the identified audio content.

In an embodiment, the notification can be provided for a predetermined period of time.

In an embodiment, the notification can be removed based at least in part on a user interaction with the video content item.

In an embodiment, the notification can be at least one of: a music icon or a notification bar.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1:
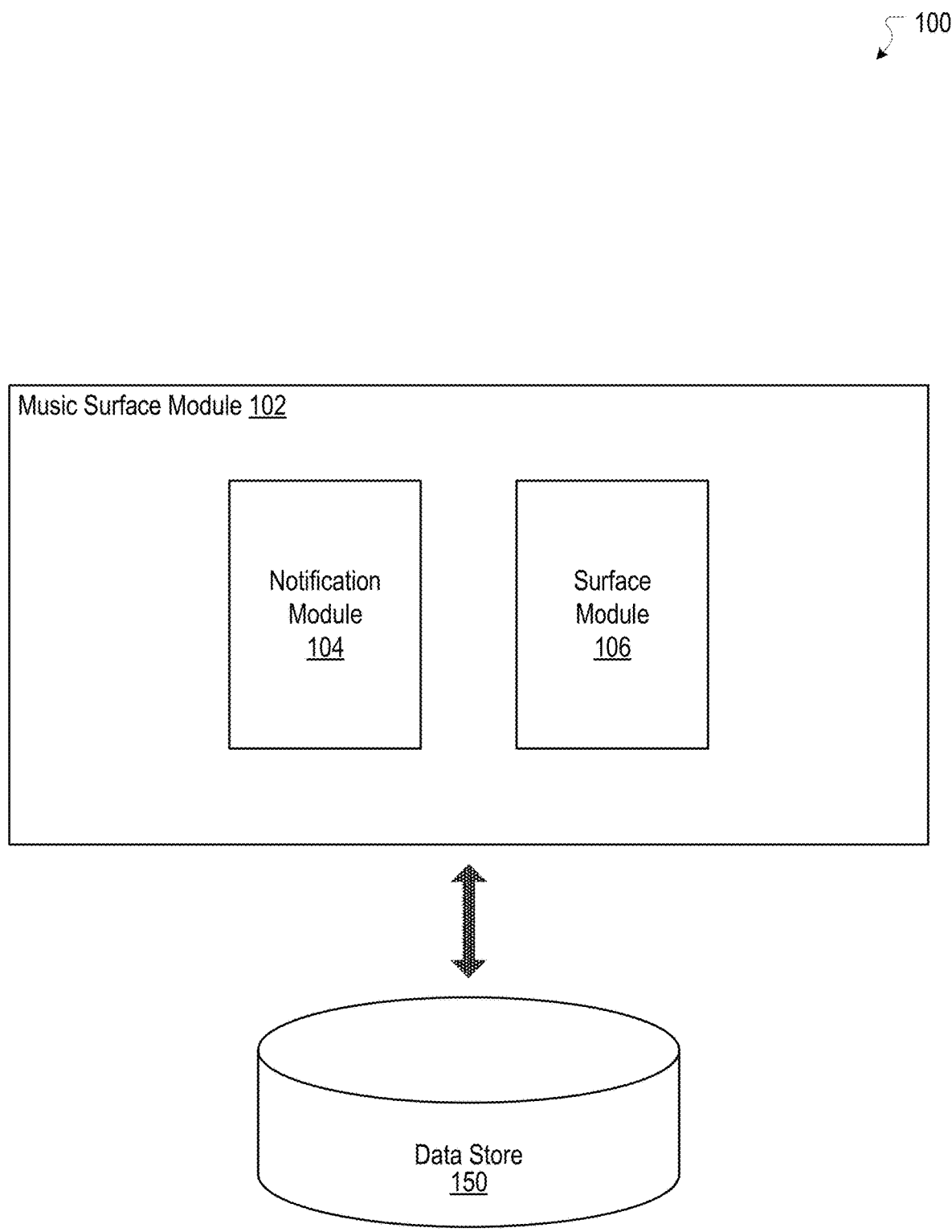
FIG. 1 illustrates an example system including a music surface module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Music Related Interactions and Interfaces

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Another user may access the social networking system and interact with the shared content item. In some cases, the shared content item can include audio content.

Under conventional approaches, a user can access a variety of content items, such as images, videos, articles, and links, provided by a content delivery platform (e.g., social networking system). Some of these content items can include audio content, such as music. In some cases, a user can access a content item, such as a video, that includes music. While the user is watching the video, the user may find the music interesting and wish to identify the music, be presented with information associated with the identified music, and further interact with the identified music. However, under conventional approaches, users cannot directly identify audio content included in content items that are not already known to the users, and users cannot directly interact with audio content in content items. Further, conventional approaches fail to provide users with user interfaces that present information associated with an identified audio content and that allow interactions with the identified audio content. Accordingly, conventional approaches are ineffective in addressing these and other problems arising in computer technology.

An improved approach rooted in computer technology overcomes the foregoing and other disadvantages associated with conventional approaches specifically arising in the realm of computer technology. In various embodiments, the present technology provides for identifying audio content in a video content item and providing a user interface for a user to access information associated with the identified audio content and interact with the identified audio content. A user can access a video content item through a digital content platform, such as a social networking system. Audio content (e.g., songs, music, song clips, etc.) in the video content item can be identified and, when the identified audio content plays, a notification can be presented. The notification can be, for example, a music icon or a notification bar, and the notification can appear for a selected duration of time. The user can interact with the notification and be presented with an interface that presents information associated with the identified audio content. The information can include, for example, a song name and an artist associated with the identified audio content as well as other video content items associated with the artist. The user can further interact with the notification, for example, by selecting a call-to-action to share the identified audio content, such as by creating a new video content item (or an image content item) utilizing the identified audio content. For example, a user can watch a video content item shared through a social networking system. The video content item can include a song clip. The song clip can be identified and, when the identified song clip starts to play, a music icon can be presented over a corner of the video content item. The user can interact with the music icon and be presented with an interface that presents a song name and an artist associated with the identified song clip as well as music videos associated with the artist. The user can select a call-to-action on the interface to create a new video content item utilizing the identified song clip and share the new video content item through the social networking system. More details relating to the disclosed technology are provided below.

FIG. 1 illustrates an example system 100 including a music surface module 102, according to an embodiment of the present technology. As shown in the example of FIG. 1, the music surface module 102 can include a notification module 104 and a surface module 106. In some instances, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the music surface module 102 can be implemented in any suitable combinations.

In some embodiments, the music surface module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the music surface module 102 can be, in part or in whole, implemented as software running on one or more computing devices or systems, such as on a server system or a client computing device. In some instances, the music surface module 102 can be, in part or in whole, implemented within or configured to operate in conjunction with or be integrated with a social networking system (or service), such as a social networking system 630 of FIG. 6. Likewise, in some instances, the music surface module 102 can be, in part or in whole, implemented within or configured to operate in conjunction with or be integrated with a client computing device, such as the user device 610 of FIGURE S. For example, the music surface module 102 can be implemented as or within a dedicated application (e.g., app), a program, or an applet running on a user computing device or client computing system. The application incorporating or implementing instructions for performing functionality of the music surface module 102 can be created by a developer. The application can be provided to or maintained in a repository. In some instances, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The music surface module 102 can be configured to communicate and/or operate with the at least one data store 150, as shown in the example system 100. The at least one data store 150 can be configured to store and maintain various types of data. In some implementations, the at least one data store 150 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the at least one data store 150 can store information that is utilized by the music surface module 102. For example, the at least one data store 150 can store information associated with identified audio content. It is contemplated that there can be many variations or other possibilities.

In various embodiments, the notification module 104 can identify audio content (e.g., music, songs, song clips, etc.) included in (or associated with) a video content item and generate a notification associated with the identified audio content. Audio content in a video content item can be identified based on a comparison of an audio fingerprint generated based on the video content item and reference audio fingerprints associated with various reference audio content (e.g., identified music, identified songs, identified song clips, etc.). The identification can be based on a reference audio content associated with a reference audio fingerprint that more closely corresponds with the generated audio fingerprint than other reference audio fingerprints. The notification module 104 can generate a notification associated with identified audio content in a video content item. As a user is watching a video content item, a notification can be presented when identified audio content is played. The notification can be presented, for example, as a music icon overlaying the video content item or a notification bar below the video content item. The user can interact with the notification to further interact with the identified audio content. More details regarding the notification module 104 will be provided with reference to FIG. 2A.

In various embodiments, the surface module 106 can cause presentation of (or present) an interface associated with an identified audio content and allow interactions associated with the identified audio content. The interface can be presented in response to a user interacting with a notification associated with an identified audio content. The interface can present information associated with the identified audio content. The information can include, for example, a song title and an artist associated with the identified audio content. The surface module 106 can allow interactions associated with identified audio content. The interactions can include, for example, sharing the identified audio content or generating a new video content item utilizing the identified audio content. More details regarding the surface module 106 will be provided with reference to FIG. 2B.

Figure 2A:
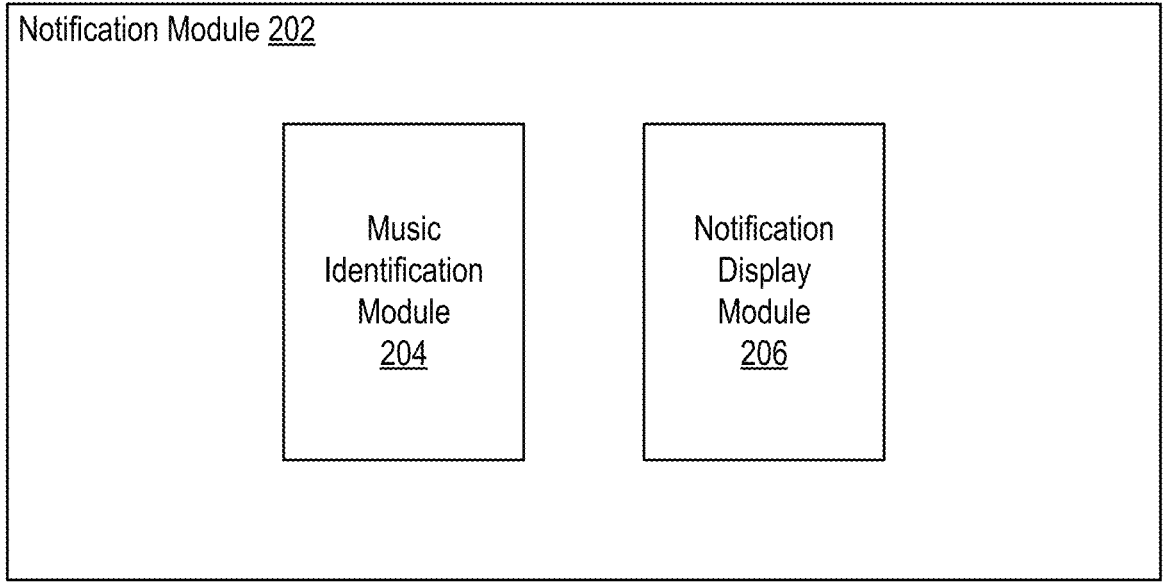
FIG. 2A illustrates an example notification module, according to an embodiment of the present technology.

FIG. 2A illustrates an example notification module 202 configured to identify audio content (e.g., music, songs, song clips, etc.) in a video content item and generate a notification associated with the identified audio content, according to an embodiment of the present technology. In some embodiments, the notification module 104 of FIG. 1 can be implemented as the notification module 202. As shown in FIG. 2A, the notification module 202 can include a music identification module 204 and a notification display module 206.

The music identification module 204 can identify audio content (e.g., music, songs, song clips, etc.) in a video content item based on one or more audio fingerprints generated based on the video content item and reference audio fingerprints associated with reference audio content (e.g., identified music, identified songs, identified song clips, etc.). To generate an audio fingerprint, an audio signal from a video content item can be divided into a number of audio frames. Each audio frame can correspond to a portion of the audio signal over a period of time (e.g., 32 milliseconds, 64 milliseconds, etc.). Various audio features can be extracted from the respective audio signal of each audio frame. Such audio features can include, for example, audio features in a frequency domain (e.g., Mel-frequency cepstral coefficients (MFCCs), spectral bandwidth measures, spectral flatness measures, spectral fluctuation, extreme value frequencies, silent frequencies, etc.) and audio features in a time domain (e.g., variation velocity, volume changes over time, mean, standard deviation, and covariance of audio signals over time, etc.). The audio fingerprint can be generated based on audio features associated with an audio frame and can be a numerical representation (e.g., matrix, vector, etc.) of the audio features associated with the audio frame. An audio fingerprint generated from a video content item can be compared with reference audio fingerprints associated with reference audio content. The comparison can be based on distance (e.g., Hamming distance) between the audio fingerprint and each reference audio fingerprint. A reference audio fingerprint that is within a threshold Hamming distance to an audio fingerprint or is closer in distance to the audio fingerprint than other reference audio fingerprints can correspond to a reference audio content on which an identification of audio content can be based. For example, a video content item can include unidentified audio content. An audio fingerprint can be generated based on an audio frame corresponding to a portion of the video content item where the audio content is included. The audio fingerprint can be compared with reference audio fingerprints associated with reference audio content, and in this example, the audio fingerprint can be closest to a reference audio fingerprint corresponding to a song clip from a popular artist. Based on the comparison, the audio content can be identified as the song clip from the popular artist. In some instances, a plurality of audio fingerprints associated with audio content can be generated and compared with various reference audio fingerprints to identify the audio content.

The notification display module 206 can generate a notification associated with identified audio content in a video content item and provide the notification for display. A notification can indicate that audio content in the video content item has been identified and that information and interactions associated with the identified audio content can be provided. In some cases, a notification can appear as a music icon. For example, the music icon can reflect any design, such as a round icon displaying a musical note. The music icon can overlay a portion of a video content item. The portion can include, for example, a bottom left corner of the video content item. The music icon can be accompanied by a message (e.g., "Hear a song you like? Tap to identify the music playing in the video."). In some cases, a notification can appear as a notification bar. The notification bar can appear, for example, below the video content item. The notification bar can display, for example, a message (e.g., "Now Playing") as well as a song title and an artist associated with an identified audio content. Many variations are possible. The notification display module 206 can provide a notification for display at a start of identified audio content in a video content item (i.e., when the identified audio content begins to play). The notification can be provided for display for a predetermined period of time (e.g., 10 seconds, 15 seconds, etc.) and be removed from display after the predetermined period of time has lapsed. A user can interact (e.g., tap, click, etc.) with the video content item before the predetermined period of time has lapsed, and the notification can be removed from display in response to the interaction. After the predetermined period of time has lapsed and the notification has been removed from display, the user can interact with the video content item, and the notification can be provided again for display in response to the interaction. The notification can be removed from display when the identified audio content is finished playing. For example, a user can watch a video content item that includes identified audio content. When the identified audio content begins to play, a notification can be provided for display. The user can tap the video content item, and the notification can be removed from display. Alternatively, the user can wait and a predetermined period of time, and the notification can be removed from display. After the notification is removed from display, the user can tap the video content item, while the audio content is still playing, and the notification can be provided again for display. Many variations are possible.

Display of notifications can vary. In some cases, a notification is provided for display when duration of identified audio content satisfies a threshold duration of time (e.g., 15 seconds, 30 seconds, 45 seconds, etc.). If the identified audio content is less than the threshold length of time, the notification will not be generated and will not be provided for display. For example, in some cases, notifications can be prevented from being provided for display based on a user setting or a user action. A user can select a setting to opt out of notifications for identified audio content and, when identified audio content is played, notifications will not be generated and will not be provided for display. In some cases, notifications can be prevented from being provided for display when a user has performed an interaction to remove notifications a threshold number of times (e.g., 2 times, 3 times, etc.). For example, a user can watch a video content item that includes four identified audio content. When the first identified audio content is played, a first notification can be provided for display. In this example, the user can tap the video content item to remove the first notification from display. When the second identified audio content is played, a second notification can be provided for display. The user can, again, tap the video content item to remove the second notification from display. In this example, the user has performed an interaction to remove notifications a threshold number of times (2 times). When the third audio content and fourth audio content are played, notifications will not be provided for display. Many variations are possible.

Figure 2B:
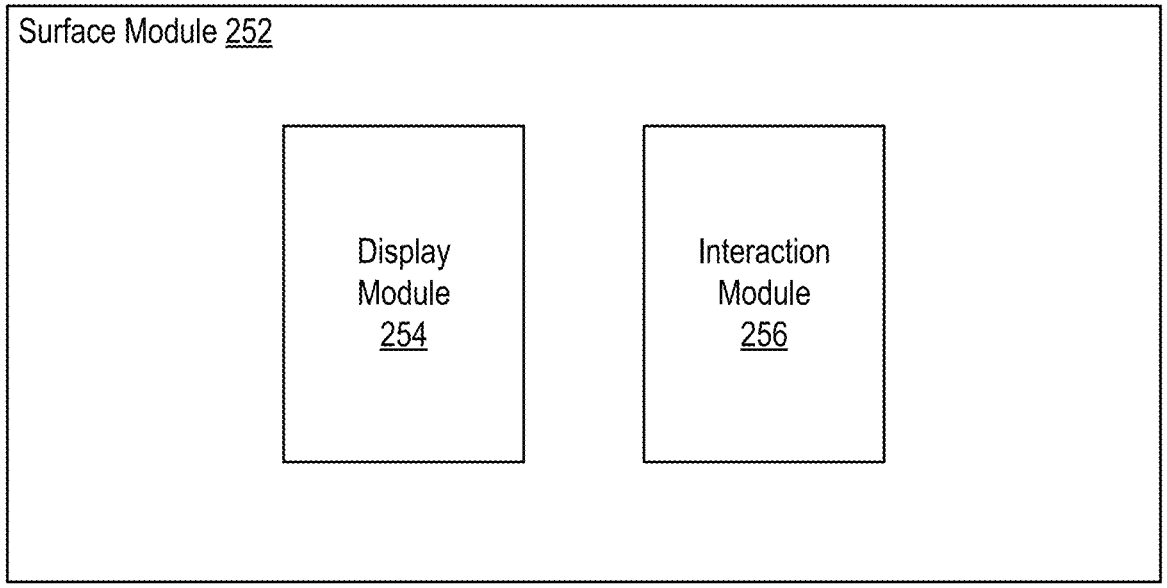
FIG. 2B illustrates an example surface module, according to an embodiment of the present technology.

FIG. 2B illustrates an example surface module 252 configured to generate an interface associated with identified audio content, cause presentation of (or present) the interface for display, and allow interactions associated with the identified audio content, according to an embodiment of the present technology. In some embodiments, the surface module 106 of FIG. 1 can be implemented as the surface module 252. As shown in FIG. 2B, the surface module 252 can include a display module 254 and an interaction module 256.

The display module 254 can generate an interface associated with an identified audio content and cause presentation of (or present) the interface for display. In some cases, the display module 254 can generate a compact view interface associated with an identified audio content. The compact view interface can be presented in response to a user interaction with a notification associated with the identified audio content. The compact view interface can present information associated with the identified audio content. The information can include, for example, a song time and an artist associated with the identified audio content. The compact view interface can also present an image or other content item associated with the identified audio content. The compact view interface can also present various call-to-actions associated with interactions with the identified audio content item. The call-to-actions can include, for example, options for posting the identified audio content, sharing the identified audio content, and generating a different video content item utilizing the identified audio content. Many variations are possible. In some cases, the display module 254 can generate a detailed view interface associated with an identified audio content. The detailed view interface can be presented in response to a user interaction with a compact view interface and be presented along with the compact view interface. The detailed view interface can present additional information associated with the identified audio content. The additional information can include, for example, recommendations for video content items based on the identified audio content, news information associated with an artist associated with the identified audio content, event information associated with the artist, posts and content shared by the artist, and links to pages associated with the artist. Recommended video content items can include, for example, video content items associated with an artist associated with identified audio content, video content items that also utilize the identified audio content, and video content items that were watched by users who have interacted with the identified audio content. For example, a user can tap a notification associated with identified audio content in a video content item and be presented with a compact view interface. The compact view interface can present a song title, an artist, and an album art image associated with the identified audio content. The user can tap (or swipe) on the compact view interface and be presented with a detailed view interface along with the compact view interface. The detailed view interface can present recommendations for video content items, such as music videos, associated with the artist. The detailed view interface can also present news and events associated with the artist. Many variations are possible.

The interaction module 256 can allow interactions associated with identified audio content. Interactions associated with identified audio content can include, for example, posting the identified audio content to a user profile or to a feed and sharing the identified audio content in a story or with other users. In some cases, an interaction with identified audio content can involve generating a new video content item utilizing the identified audio content. A new video content item utilizing identified audio content can be based on an image, such as an album art image associated with the identified audio content, a stock image, or a user submitted image, or a video, such as a user submitted video. In some cases, an image content item including an image (e.g., album art image associated with the identified audio content, a stock image, a user submitted image, etc.) can be generated by utilizing the identified audio content. For example, a user can watch a video content item that includes identified audio content. The user can tap on a call-to-action to post the identified audio content to a user profile associated with the user. Posting the identified audio content can involve generating a new video content item utilizing the identified audio content. The user can be prompted to submit or select a desired video, and the new video content item can be generated based on the video and the identified audio content. The new video content item can play the video while the identified audio content plays. Many variations are possible.

Figure 3:
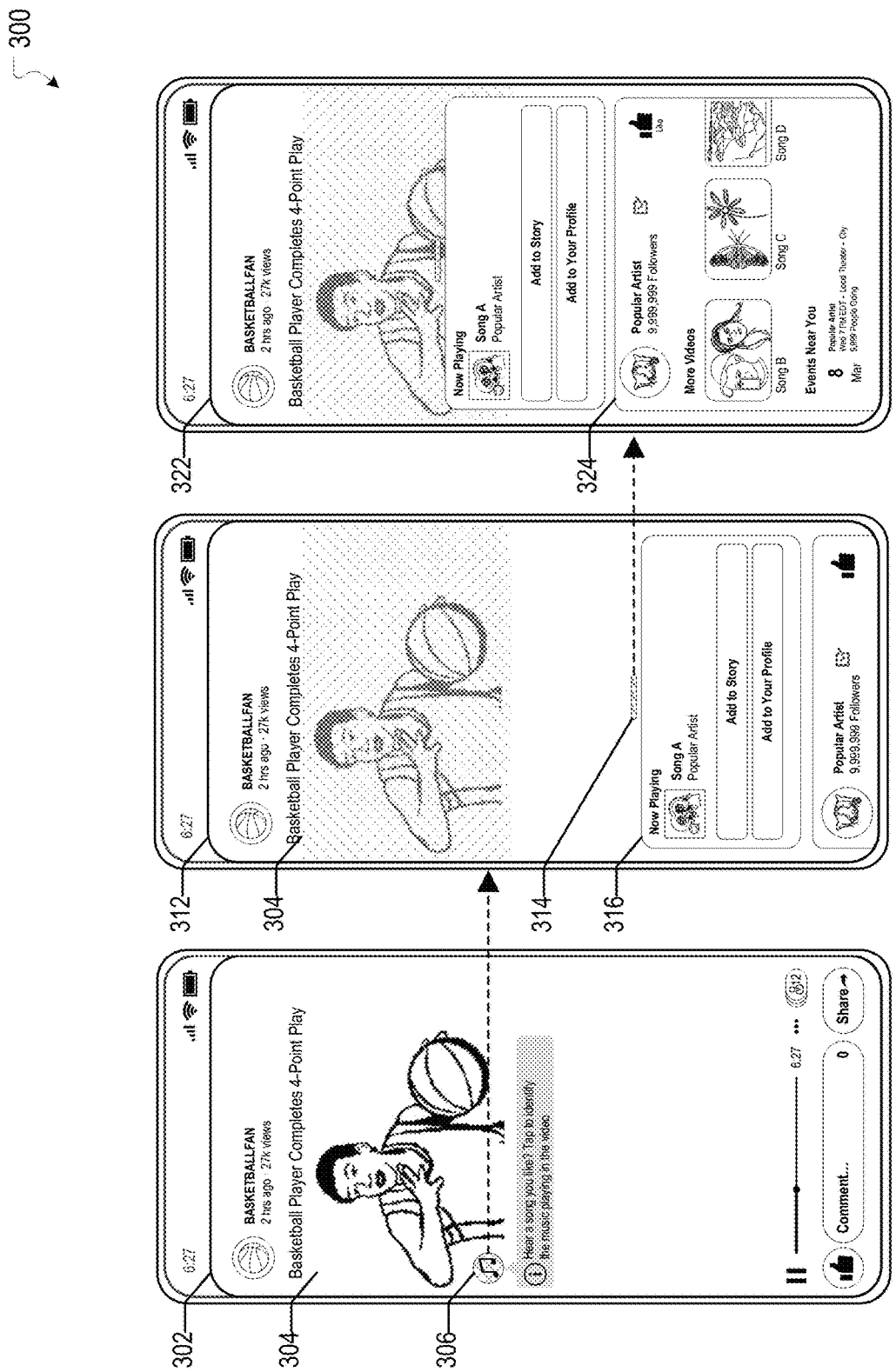
FIG. 3 illustrates an example sequence of interfaces, according to an embodiment of the present technology.

FIG. 3 illustrates an example sequence of interfaces 300, according to an embodiment of the present technology. The sequence of interfaces 300 can be generated and supported by the music surface module 102. The sequence of interfaces 300 can be presented through a display screen of a computing device. The sequence of interfaces 300 can be provided through an application (e.g., a web browser, a social network application, a messaging application, etc.) running on the computing device.

In this example, a first interface 302 presents a video content item 304 about basketball. The video content item 304 includes a song as audio content. As the video content item plays, the video content item 304 reaches a portion including the song. Upon reaching the portion including the song, the first interface 302 presents a notification 306 indicating that the song is identified and that information and interactions associated with the identified song can be provided. The song can be identified through the techniques described herein. In this example, the notification 306 is presented as a music icon. A user can interact with the notification 306 by tapping the notification 306. Upon tapping the notification 306, the user can be presented with a second interface 312. The second interface 312 presents the video content item 304 about basketball. In the second interface 312, the video content item 304 is dimmed and continues to play as a compact view interface 316 is presented. The compact view interface 316 presents information associated with the identified song. In this example, the compact view interface 316 presents a song title, "Song A," and an artist, "Popular Artist," associated with the identified song. The user can tap on a control 314 above the compact view interface 316 or swipe up on the compact view interface 316 to be presented with a detailed view interface. A third interface 322 presents a detailed view interface 324. The detailed view interface 324 presents additional information associated with the identified song. In this example, the detailed view interface 324 presents recommendations for a video content item titled "Song B," a video content item titled "Song C," and a video content item titled "Song D" based on the identified song. These video content items can be, for example, music videos associated with the artist. The detailed view interface 324 also presents event information associated with the artist. All examples herein are provided for illustrative purposes, and there can be many variations and other possibilities.

Figure 4A:
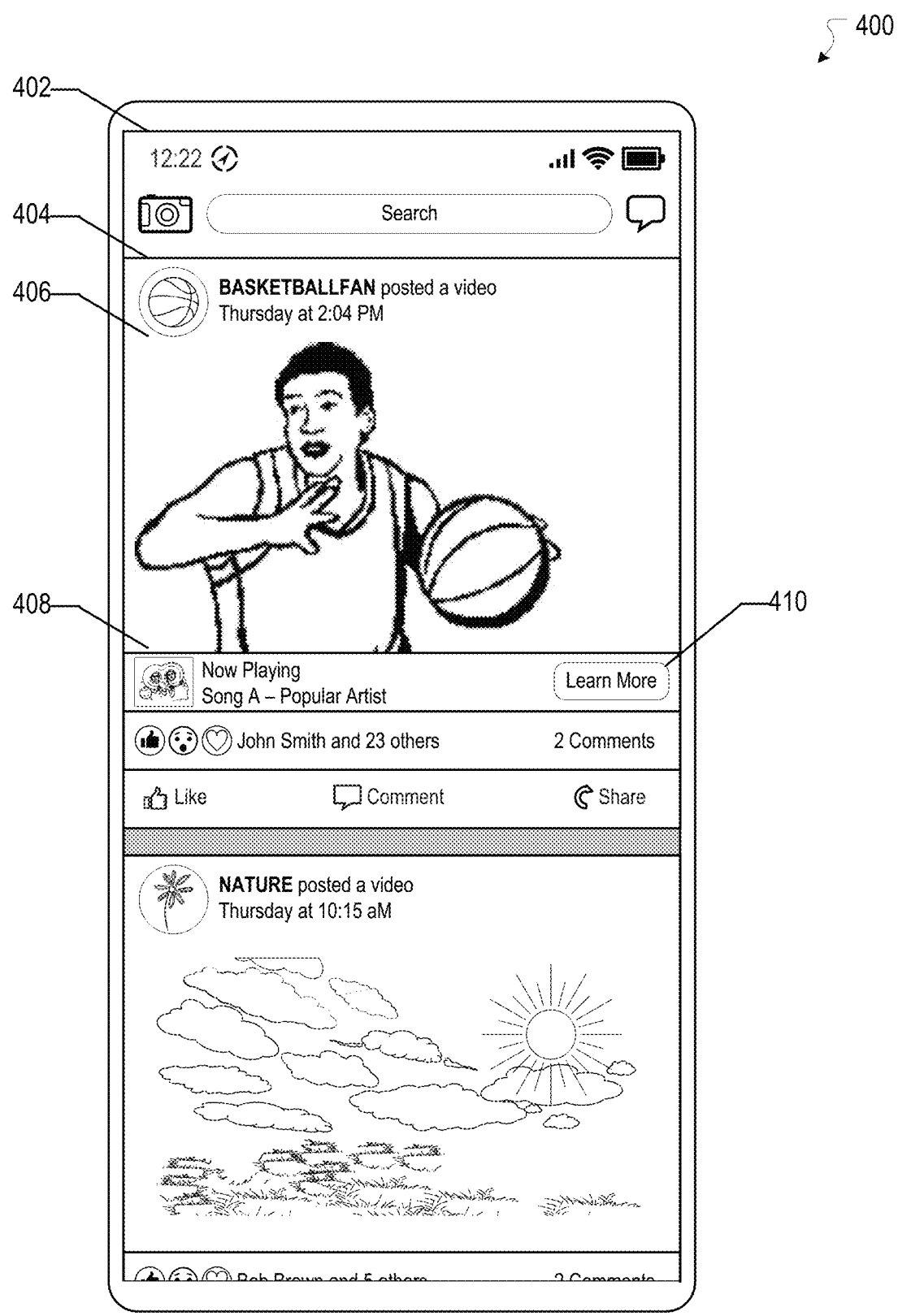
FIG. 4A-4B illustrate example interfaces, according to an embodiment of the present technology.
Figure 4B:
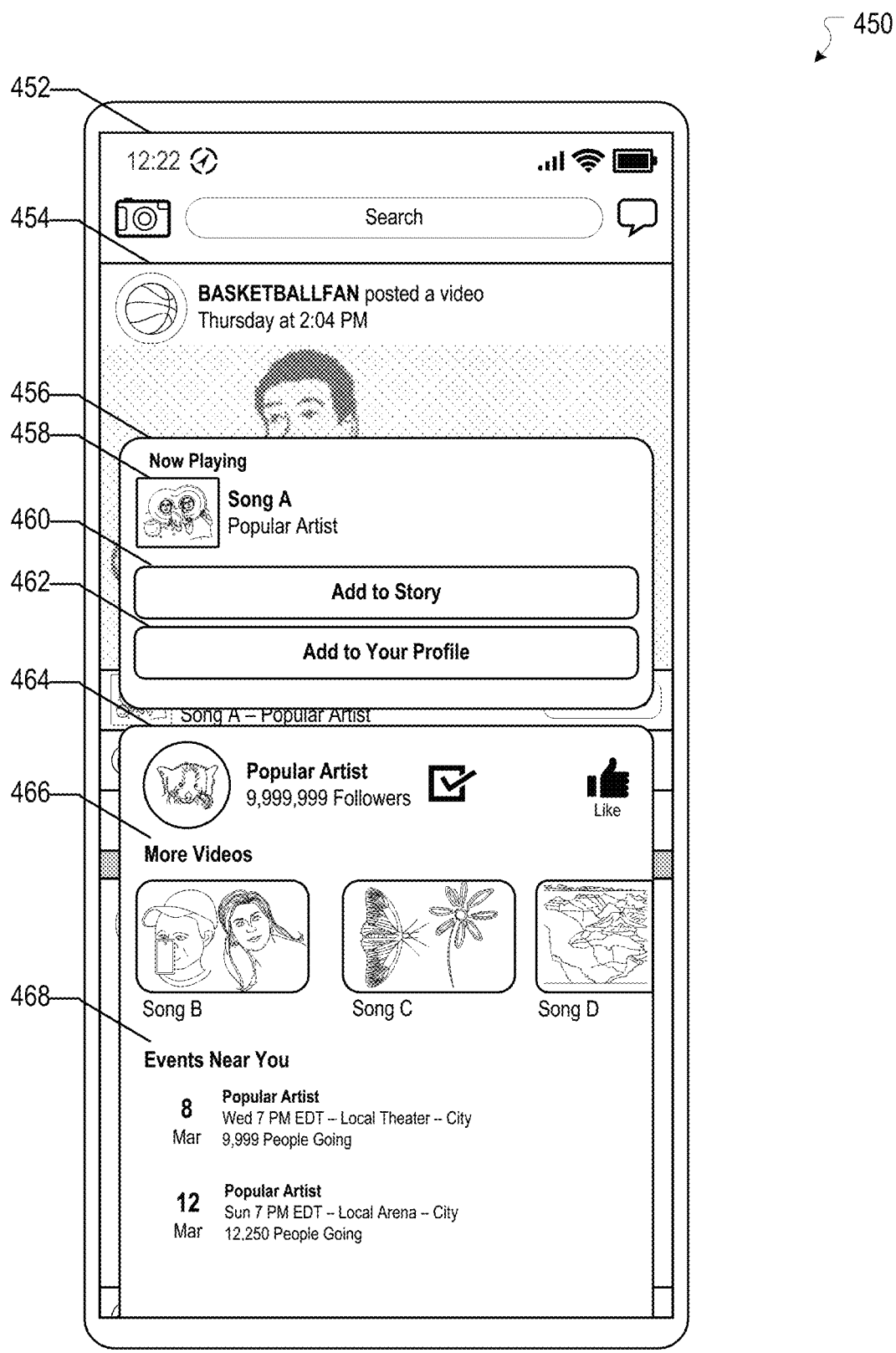

FIG. 4A-4B illustrate example interfaces 400, 450, according to an embodiment of the present technology. The example interfaces 400, 450 can be generated and supported by the music surface module 102. The example interfaces 400, 450 can be presented through a display screen of a computing device. The example interfaces 400, 450 can be provided through an application (e.g., a web browser, a social network application, a messaging application, etc.) running on the computing device.

FIG. 4A illustrates an example interface 400 presenting a feed 402 associated with a digital content platform. The feed 402 can include a post 404 by a user, "BASKETBALLFAN," that has posted a video content item 406. In this example, the video content item 406 includes a song as audio content. As the video content item 406 plays and reaches a portion including the song, the interface 400 presents a notification 408 indicating that the song is identified and that information and interactions associated with the identified song can be provided. In this example, the notification 408 is presented as a notification bar. The notification 408 can present information associated with the identified song, which in this example, includes a song title, "Song A," and an artist, "Popular Artist," associated with the identified song. A user can tap on a "Learn More" button 410 in the notification 408 to learn more about the song and the artist. All examples herein are provided for illustrative purposes, and there can be many variations and other possibilities.

FIG. 4B illustrates an example interface 450 presenting a feed 452 associated with a digital content platform. The feed 452 can include a post by a user, "BASKETBALLFAN," that has posted a video content item including an identified song. The interface 450 presents a compact view interface 456 along with a detailed view interface 464, The compact view interface 456 presents information 458 associated with the identified song. In this example, the information 458 includes an image, a song title, "Song A," and an artist, "Popular Artist," associated with the identified song. The compact view interface 456 also presents call-to-actions 460, 462 associated with potential interactions with the identified song. In this example, a first call-to-action 460 is associated with adding the identified song to a story, and a second call-to-action 462 is associated with adding the identified song to a user profile. The detailed view interface 464 presents additional information associated with the identified song. In this example, the additional information includes recommendations 466 for video content items based on the identified song. The video content items can be, for example, music videos for other songs associated with the artist. The additional information also includes event information 468. The event information 468 presents when the artist will perform based on a geographic location. All examples herein are provided for illustrative purposes, and there can be many variations and other possibilities.

Figure 5:
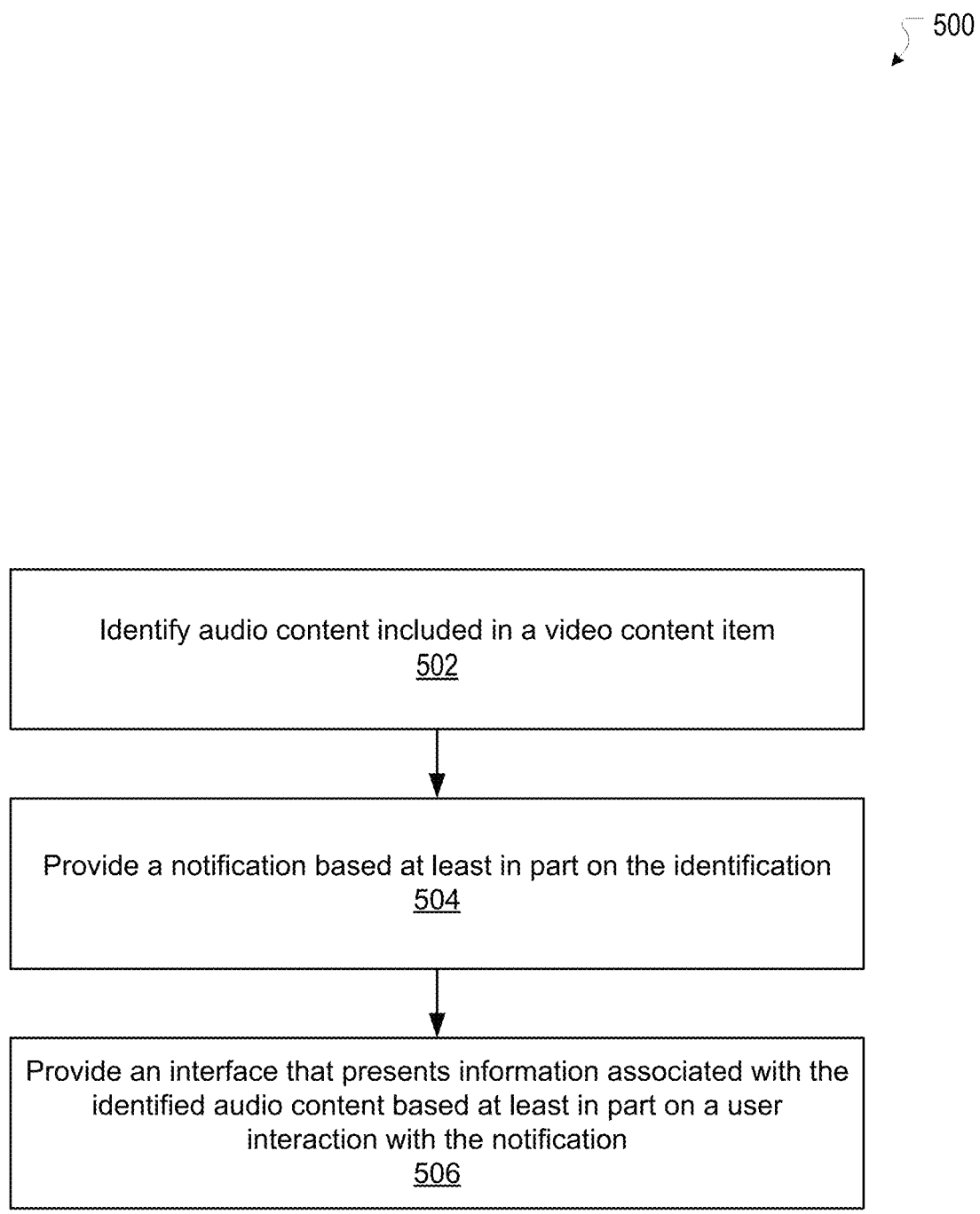
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 identifies audio content included in a video content item. At block 504, the example method 500 provides a notification based at least in part on the identification. At block 506, the example method 500 provides an interface that presents information associated with the identified audio content based at least in part on a user interaction with the notification.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
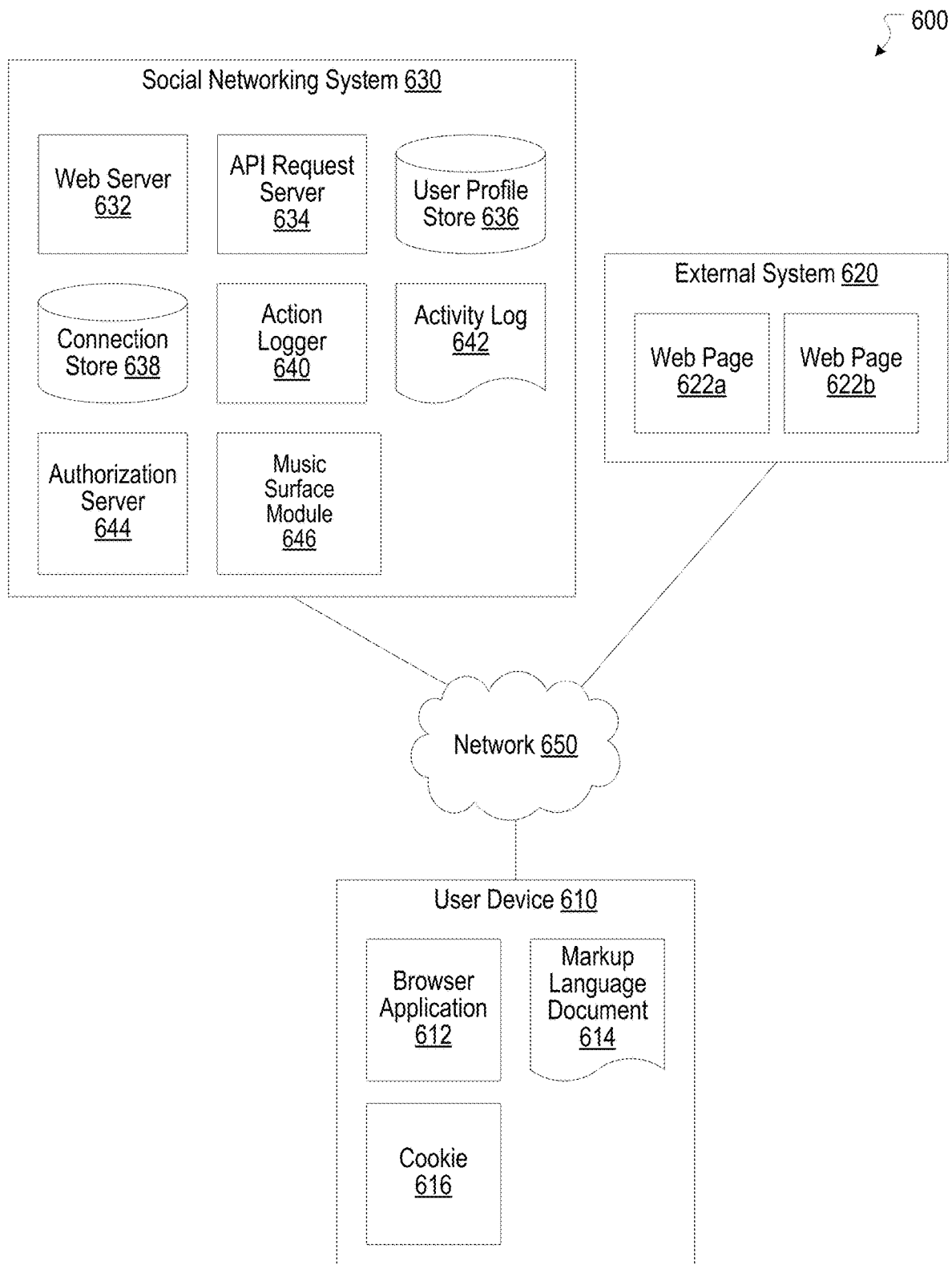
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a music surface module 646. The music surface module 646 can, for example, be implemented as the music surface module 102, as discussed in more detail herein. As discussed previously, it should be appreciated that there can be many variations or other possibilities. For example, in some embodiments, one or more functionalities of the music surface module 646 can be implemented in the user device 610. As discussed previously, it should be appreciated that there can be many variations or other possibilities.

Hardware Implementation

Figure 7:
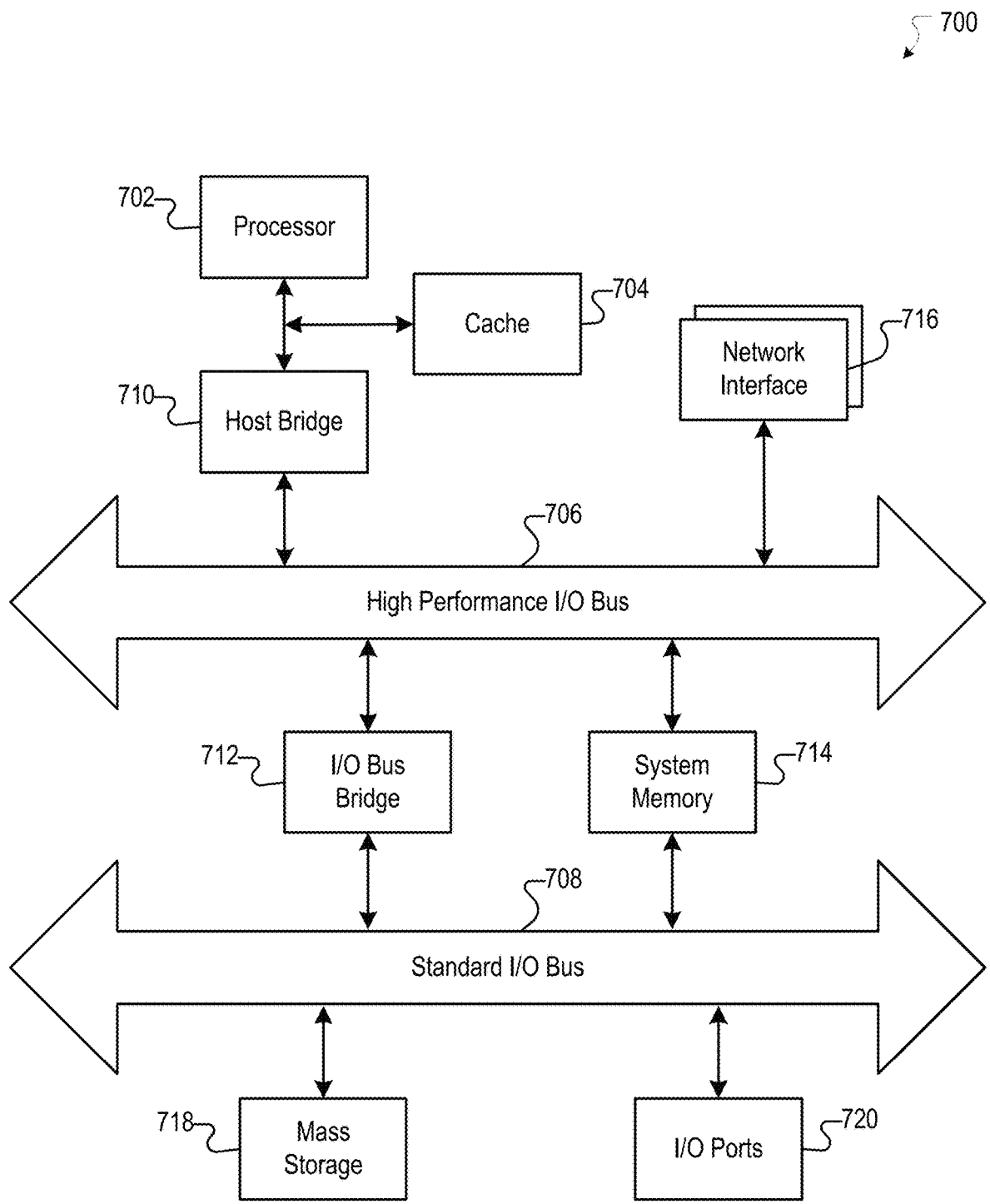
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
identifying, by a computing system, audio content that satisfies a threshold duration of time in a video content item based on audio fingerprints generated from audio features associated with audio frames of the audio content;
providing, by the computing system, in a first interface, a first notification for a predetermined period of time based at least in part on the identified audio content, wherein the first notification is removed after the predetermined period of time;
providing, by the computing system, a second notification based at least in part on a first user interaction with the video content item, wherein the second notification is removed when the identified audio content is finished;
providing, by the computing system, a second interface that presents information associated with the identified audio content based at least in part on a second user interaction with the second notification;
providing, by the computing system, a third interface that presents one or more recommendations associated with the identified audio content based at least in part on a third user interaction with the second interface; and
preventing, by the computing system, provision of subsequent notifications associated with subsequent identified audio content in the video content item based at least in part on a satisfaction of a threshold number of user interactions to remove notifications.

2. The computer-implemented method of claim 1, wherein the second interface further presents a call-to-action associated with an action that can be performed based at least in part on the identified audio content.

3. The computer-implemented method of claim 2, wherein the action that can be performed based at least in part on the identified audio content involves a generation of a new video content item based at least in part on the identified audio content.

4. The computer-implemented method of claim 3, wherein the generation of the new video content item is further based at least in part on at least one of: an album art image, a stock image, a user submitted image, or a user submitted video.

5. The computer-implemented method of claim 1, wherein the one or more recommendations include at least one recommendation for another video content item based at least in part on the identified audio content.

6. The computer-implemented method of claim 1, wherein the video content item is dimmed and continues to play while the second interface is provided.

7. The computer-implemented method of claim 1, wherein the first notification is provided at a start of the identified audio content and the first notification is removed from display before the predetermined period of time has lapsed based at least in part on a fourth user interaction with the video content item.

8. The computer-implemented method of claim 1, wherein the first notification overlays at least a portion of the video content item, and wherein the second interface and the third interface overlay at least a portion of the first interface.

9. The computer-implemented method of claim 1, wherein the user interactions to remove notifications include a tap on the video content item.

10. The computer-implemented method of claim 1, wherein the first notification is at least one of: a music icon or a notification bar.

11. A system comprising:
at least one processor; and
a memory storing instructions that, when executed by the at least one processor, cause the system to perform a method comprising:
identifying audio content that satisfies a threshold duration of time in a video content item based on audio fingerprints generated from audio features associated with audio frames of the audio content;
providing, in a first interface, a first notification for a predetermined period of time based at least in part on the identified audio content, wherein the first notification is removed after the predetermined period of time;
providing, a second notification based at least in part on a first user interaction with the video content item, wherein the second notification is removed when the identified audio content is finished;
providing a second interface that presents information associated with the identified audio content based at least in part on a second user interaction with the second notification;
providing a third interface that presents one or more recommendations associated with the identified audio content based at least in part on a third user interaction with the second interface; and
preventing provision of subsequent notifications associated with subsequent identified audio content in the video content item based at least in part on a satisfaction of a threshold number of user interactions to remove notifications.

12. The system of claim 11, wherein the second interface further presents a call-to-action associated with an action that can be performed based at least in part on the identified audio content.

13. The system of claim 12, wherein the action that can be performed based at least in part on the identified audio content involves a generation of a new video content item based at least in part on the identified audio content.

14. The system of claim 13, wherein the generation of the new video content item is further based at least in part on at least one of: an album art image, a stock image, a user submitted image, or a user submitted video.

15. The system of claim 11, wherein the one or more recommendations include at least one recommendation for another video content item based at least in part on the identified audio content.

16. A non-transitory computer-readable storage medium including instructions that, when executed by at least one processor of a computing system, cause the computing system to perform a method comprising:
identifying audio content that satisfies a threshold duration of time in a video content item based on audio fingerprints generated from audio features associated with audio frames of the audio content;
providing, in a first interface, a first notification for a predetermined period of time based at least in part on the identified audio content, wherein the first notification is removed after the predetermined period of time;
providing, a second notification based at least in part on a first user interaction with the video content item, wherein the second notification is removed when the identified audio content is finished;
providing a second interface that presents information associated with the identified audio content based at least in part on a second user interaction with the second notification;
providing a third interface that provides one or more recommendations associated with the identified audio content based at least in part on a third user interaction with the second interface; and
preventing provision of subsequent notifications associated with subsequent identified audio content in the video content item based at least in part on a satisfaction of a threshold number of user interactions to remove notifications.

17. The non-transitory computer-readable storage medium of claim 16, wherein the second interface presents a call-to-action associated with an action that can be performed based at least in part on the identified audio content.

18. The non-transitory computer-readable storage medium of claim 17, wherein the action that can be performed based at least in part on the audio content involves a generation of a new video content item based at least in part on the identified audio content.

19. The non-transitory computer-readable storage medium of claim 18, wherein the generation of the new video content item is further based at least in part on at least one of: an album art image, a stock image, a user submitted image or a user submitted video.

20. The non-transitory computer-readable storage medium of claim 16, wherein the one or more recommendations include at least one recommendation for another video content item based at least in part on the identified audio content.

* * * * *